Sept. 22, 1936. J. F. M. CAUDRI 2,055,425
PROCESS OF TREATING MINERAL OIL DISTILLATES
Filed Sept. 27, 1933
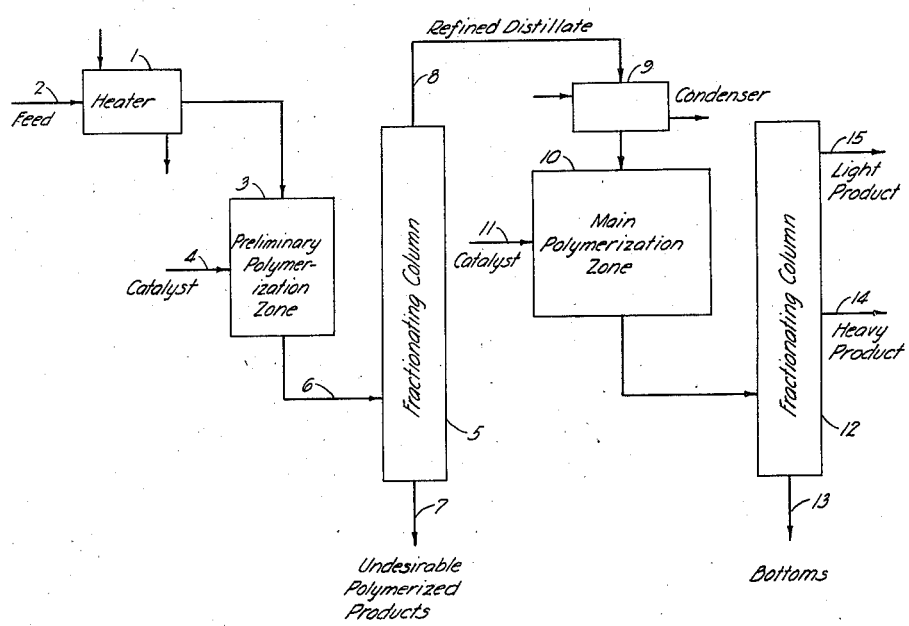
Inventor: Johan Ferdinand Maurits Caudri
By his Attorney:

Patented Sept. 22, 1936

2,055,425

UNITED STATES PATENT OFFICE 2,055,425

PROCESS OF TREATING MINERAL OIL DISTILLATES

Johan Ferdinand Maurits Caudri, Amsterdam, Netherlands, assignor to Shell Development Company, San Francisco, Calif., a corporation of Delaware Application September 27, 1933, Serial No. 691,249
In the Netherlands October 3, 1932

4 Claims. (Cl. 196—78)

This invention relates to processes of making synthetic oils and is particularly concerned with certain improvements directed to increase the yield of the synthetic oils which are stable against oxidation.

It is known to produce syntheic oils by polymerization of unsaturated hydrocarbons, and particularly hydrocarbon mixtures containing unsaturated compounds formed by cracking of petroleum.

It is old, in general, to employ a light refining treatment as a pretreating step and to follow it by an intensive polymerizing treatment of a partly or fully refined distillate.

The process of this invention consists of pretreating the distillate to be polymerized, preferably a vapour phase cracked distillate, with a small quantity of a catalyst at an elevated temperature, substantially separating the sludge and formed polymers from the refined portion and then treating the latter in the usual way with the same catalyst, or with some other catalyst, in order to obtain the desired synthetic oils. It was found that such method of treatment produces much better results, as measured in terms of the yield and the degree of stability of the synthetic product, than it was possible to obtain by old methods.

According to this invention, it was found preferable to carry out the preliminary polymerization with a quantity of active AlCl₃ not exceeding 2% by weight of the distillate being treated and at a temperature approximately corresponding (±5° C.) to the boiling temperature of the distillate, i. e. the temperature at which its vapour pressure is about one atmosphere. Pre-treatments at elevated temperatures with only small quantities of AlCl₃ were found to be quite effective for removing undesirable substances, such as catalyst poisons, and inasmuch as the polymerization of these undesirable substances required shorter treating time than would have been necessary if lower temperatures were used, and also because such substances are removed with smaller loss of useful unsaturated hydrocarbons than could be realized before. In the preliminary treatment it is desirable not to waste the unsaturated hydrocarbon which is desired to polymerize into oil during the main step of the process, and, for reasons of economy, to conserve the catalyst. Both of the desiderata are promoted by using small amounts of catalyst. Although it is at times possible to operate with larger amounts, it is preferred to use not more than 2% of catalyst, because it has been found that this is sufficient to effect the removal of substantial amounts of catalyst poisons.

The separation of sludge and polymers formed during pre-treating operation may be accomplished by decantation, preferably supplemented by distillation at suitable temperature and pressures, to prevent decomposition (cracking) of the refined material.

A number of polymerizing catalysts similar in their action to AlCl₃ are known and can be used in the process of this invention; their quantities in the preliminary and final treatments can be varied depending upon this degree of catalytic activity. The polymerizing catalysts used in my pretreating operation must possess a relatively high degree of activity.

As one of the features of this invention, it was found advantageous in some cases to separate the distillate to be treated, such as untreated cracked gasoline, into a number of fractions and then pre-treat only some of them separately or together at elevated temperatures; the pre-treated fractions may then be re-run, in order to separate the polymers, and then subjected either separately from or together with untreated fractions to the final polymerizing treatment with AlCl₃, or similar polymerizing catalyst. Such manner of treatment usually results in the economy of the catalyst and high yield of the desired synthetic product.

The invention will be further explained with reference to the accompanying drawing, which is a flow sheet of one embodiment of my invention. The invention is, however, not limited to the particular arrangement shown in said drawing. In the drawing, 1 is a heater for heating a suitable distillate, introduced through a pipe 2, to an elevated temperature for treatment in the apparatus 3. A small quantity of active catalyst, preferably not exceeding 2% by weight of the distillate, is introduced through an inlet 4 and contacted with the distillate at an elevated temperature, preferably within 5° C. of the boiling temperature of the distillate. Undesirable substances are polymerized in the apparatus 3 and the resulting mixture is led to a fractionating column 5 through a conduit 6. Undesirable polymerized products are withdrawn at 7, and the refined distillate is withdrawn through a conduit 8, cooled in a condenser 9, and subjected to the main polymerization treatment in an apparatus 10. The temperature in the apparatus 10 is maintained below cracking and may, for example, be 30° C., or any other value at which effective polymerization is obtained. The necessary catalyst is introduced into the apparatus 10 through an inlet 11. The polymerized products are then introduced into a fractionating column 12, where products of different boiling ranges are separated and discharged through the outlets 12, 13 and 14.

In order further to illustrate this invention, the following examples are set forth.

Example 1

200 cm³ (139 gr.) of a fraction boiling from 65°–75° C. from a vapour phase cracked gasoline distillate was subjected to polymerization with 8 gr. AlCl₃ at 30° C. After the treatment was continued for 22 hours the yield of lubricating oil was 24.3 gr. The viscosity of the oil at 50° C. was 200° E., while the resinification test gave 6.5% asphaltenes.

The same raw material was subjected at 70° C. to a pre-treatment with a little AlCl₃ (2 gr. AlCl₃ on 200 cm³ of distillate). After this treatment 865 cm³ raffinate was obtained from 1100 cm³ by distillation.

From 200 cm³ (139 gr.) of this raffinate 47.1 gr. lubricating oil with a viscosity of 54° E. at 50° C. was obtained by polymerization with 8 gr. AlCl₃ at 30° C., likewise for 22 hours. After the resinification test the asphaltene content was 0.91%.

Example 2

2180 cm³ (1605 gr.) of a vapour phase cracked distillate was treated for 6 hours with 12 gr. AlCl₃ at a temperature of 70° C. After removing the sludge and distilling, 1633 cm³ (1189 gr.) raffinate was obtained.

200 cm³ (146 gr.) or this raffinate was polymerized for 11 hours at 30° C. with 16 gr. AlCl₃. 36.0 gr. lubricating oil was obtained; the resinification test gave no asphaltenes at all.

Example 3

39.5 litres (28.5 kilos) of a vapour phase cracked gasoline distillate was treated for 22 hours with 220 gr. AlCl₃ (0.77% by weight) at a temperature of 85° C. (boiling temperature). After removing the sludge and distilling, 29.7 litres (21.56 kilos) raffinate was obtained.

6 litres (4.35 kilos) of this raffinate was polymerized for 39 hours with 480 gr. AlCl₃ at an average temperature of 30° C. (max. temp. 40° C., min. temp. 23° C.). 1.384 kilos lubricating oil was obtained, which gave very good results in the engine tests made.

Example 4

From the following example it appears that the pretreatment at an elevated temperature gives more favourable results than the pretreatment at about room temperature.

575 cm³ (444 gr.) of a fraction of a vapour phase crack benzine boiling between 145 and 155° was subjected for 6 hours at 120° C. to a pretreatment with 5 gr. AlCl₃. After separation of the sludge the mixture was distilled, 460 cm³ (351 gr.) of a fraction boiling between 145 and 155° C. being recovered. The distillation residue, after having been steamed out at 100° C., gave 50.9 gr. of a very viscous unserviceable oil. 200 cm³ (153 gr.) of the raffinate was polymerized during 22 hours at 30° C. with 8 gr. AlCl₃. The yield obtained was 53.8 gr. of a cylinder oil with a viscosity of 46.0 degrees Engler at 50° C.

Upon the pretreatment being carried out under the same conditions, but this time at 30° C. and during 24 hours, 500 cm³ (384 gr.) of raffinate was obtained and, also, after the residue had been steamed out, 19.9 gr. of an unserviceable, viscous oil. 200 cm³ (153 gr.) of the raffinate gave, after polymerization under the conditions mentioned, 49.6 gr. of an oil with a viscosity of 84.0 degrees Engler at 50° C. Thus this oil is so viscous that in practice it comes no longer into consideration as a cylinder oil.

From the above it is also clear that the pretreatment at elevated temperature brings about a substantially easier removal of the resin-forming substances than the pretreatment at 30° C.

It is noted from these examples that a refining treatment of a raw cracked distillate with a polymerizing catalyst at a somewhat elevated non-cracking temperature (the initial cracking temperature in the presence of aluminum chloride being about 160° C.), which preferably corresponds to the initial boiling temperature of the distillate and usually is between 60° C. and 130 C., has a very favourable effect upon the yield and the stability of the ultimate synthetic oil produced by polymerizing the refined portion of the distillate, which effect is apparently due to the selective polymerization and subsequent removal of catalyst poisons and other undesirable substances.

It is known, that raw cracked distillates derived from petroleum and some other sources usually contain considerable quantities of H₂S and other sulphur compounds which are particularly active in destroying the effectiveness of many known polymerizing catalysts; the elimination of these comparatively easily removable substances by such treatments as washing with an alkaline solution or by fractionation was in some cases found to be beneficial before subjecting the selected cracked distillate to the treatment of this invention.

I claim as my invention:

1. In the process of manufacturing a stable synthetic oil from a mineral oil distillate boiling within gasoline range and containing a substantial proportion of unsaturated hydrocarbons capable of forming stable lubricating oils upon polymerization with active polymerization catalysts and substances poisonous to such catalysts, the steps of refining said distillate by selectively polymerizing said substances by means of a small quantity of an active aluminum chloride at an elevated non-cracking polymerizing temperature above 60° C. for a time sufficient to effect polymerization of the said poisonous substances, said quantity being less than 2% by weight of the distillate, separating the refined portion of the treated distillate from its residual portion and then treating the refined portion under non-cracking polymerizing conditions with a larger quantity of aluminum chloride sufficient to effect substantially complete polymerization of the said unsaturated hydrocarbons.

2. The process of claim 1, in which the refining temperature is between 60° and 130° C.

3. The process of claim 1, in which the gasoline type distillate has an initial boiling point between 60° and 130° C., and the refining temperature is ±5° C. of the initial boiling temperature and not below 60° C.

4. The process of claim 1, in which the refined portion is polymerized at a temperature which is substantially lower than the refining temperature.

JOHAN FERDINAND MAURITS CAUDRI.